(12) United States Patent
Colombo et al.

(10) Patent No.: US 8,714,891 B2
(45) Date of Patent: May 6, 2014

(54) APPARATUS FOR MAKING VARIABLE DIAMETER HOLES IN METAL PLATES

(75) Inventors: Christian Colombo, Milan (IT); Stefano Fongaro, Castronno (IT); Roberto Donatelli, Induno Olona (IT)

(73) Assignee: FICEP S.p.A., Gazzada Schianno (IT)

( * ) Notice: Subject to any disclaimer, the term of this patent is extended or adjusted under 35 U.S.C. 154(b) by 1320 days.

(21) Appl. No.: 12/498,550

(22) Filed: Jul. 7, 2009

(65) Prior Publication Data
US 2010/0008741 A1  Jan. 14, 2010

(30) Foreign Application Priority Data

Jul. 10, 2008 (IT) .............................. MI2008A1251

(51) Int. Cl.
*B23C 1/06* (2006.01)
(52) U.S. Cl.
USPC ............................ 409/191; 409/137; 409/202
(58) Field of Classification Search
USPC ......... 409/145, 159, 172, 190, 191, 202, 212, 409/235, 137
See application file for complete search history.

(56) References Cited

U.S. PATENT DOCUMENTS

| 3,828,649 | A | * | 8/1974 | Lecailtel et al. | 409/137 |
| 4,382,728 | A | * | 5/1983 | Anderson et al. | 409/137 |
| 4,822,219 | A | * | 4/1989 | Wood et al. | 409/137 |
| 7,043,333 | B2 | * | 5/2006 | Schiavi et al. | 700/186 |
| 7,220,088 | B2 | * | 5/2007 | Ferrari et al. | 409/204 |
| 2007/0031204 | A1 | * | 2/2007 | Tanoue et al. | 409/134 |
| 2007/0059116 | A1 | * | 3/2007 | Brunemann | 409/201 |

FOREIGN PATENT DOCUMENTS

| JP | 06198509 A | * | 7/1994 | B23B 47/28 |
| WO | WO 2006043173 A2 | * | 4/2006 | B23Q 1/54 |

* cited by examiner

*Primary Examiner* — Daniel Howell
*Assistant Examiner* — Michael Vitale
(74) *Attorney, Agent, or Firm* — Kirschstein, et al

(57) ABSTRACT

An apparatus for making variable diameter and shape holes through metal plates in a sheet plate machining gantry machine comprises two parallel cross members and two horizontal parallel guides integral with the cross members and supporting a horizontal cross arm which is controllably driven on the guides, the horizontal arm supporting horizontal parallel guides therealong is controllably driven an apparatus including a milling tool which can controllably driven in a vertical plane. The method comprises the step of controllably simultaneously driving a two-fluted mill both in a vertical plane (Z), and in a horizontal plane (U).

7 Claims, 7 Drawing Sheets

APPARATUS FOR MAKING VARIABLE DIAMETER HOLES IN METAL PLATES

BACKGROUND OF THE INVENTION

The present invention relates to an apparatus for making different diameter and shape holes through a metal plate in a metal plate processing machine.

As is known, from different constructions conventionally are used, as a base material, large-size metal plates which are machined in gantry machines, including a horizontal beam which is controllably driven with respect to the metal plate being machined, and comprising moreover high power driving motors adapted to directly drill or pierce the sheet metal plate, to form therethrough both small holes or slots, having for example a size of 20-30 mm, and a much larger diameter holes, having for example a diameter of 200 to 250 mm, which are made by including in the gantry machine very high power electric motors. Moreover, for each hole diameter, it is also necessary to provide and use different diameter tools.

Thus, the above drilling or piercing operations are very complex, inter alia because of additional operations required for changing the drilling or piercing tools.

To the above it should be also added that while power motors are necessary for making large diameter holes by large diameter tools operated at a high speed, said high power motors represent a drawback as the above machines are used to make small diameter holes by small diameter tools operated at high speed.

While the following disclosure will be referred to circular holes having a set diameter, it should be apparent that the inventive apparatus may also be used to make openings or slots of any desired polygonal shape, such as a triangular or rectangular shape.

SUMMARY OF THE INVENTION

Accordingly, the aim of the present invention is to provide an apparatus, to be applied to a gantry machine, allowing a small diameter milling/drilling tool to make both small diameter holes and large diameter holes or slots, by using, for the drilling or piercing operations, a small power motor.

According to the invention the above aim is achieved by an apparatus for making variable diameter holes in a metal plate machining gantry machine including two parallel cross members, characterized in that said apparatus comprises two horizontal parallel guides, Integral with said parallel cross members and supporting a cross arm controllably driven on said guides, that said cross arm supports horizontal parallel guides therealong is controllably driven an apparatus supporting a rotary milling tool which is controllably driven in a vertical plane.

The operating method comprising the step of simultaneously controllably driving the rotary tool both in a vertical plane and in a horizontal plane.

Further characteristics of the invention will become more apparent hereinafter from the following disclosure, the dependent claims and the accompanying drawings.

BRIEF DESCRIPTION OF THE DRAWINGS

The invention will be disclosed in a come more detailed manner hereinafter by the following disclosure of an embodiment thereof, given only by way of an example and with reference to the accompanying drawings, where.

DESCRIPTION OF THE PREFERRED EMBODIMENTS

Figure 1:
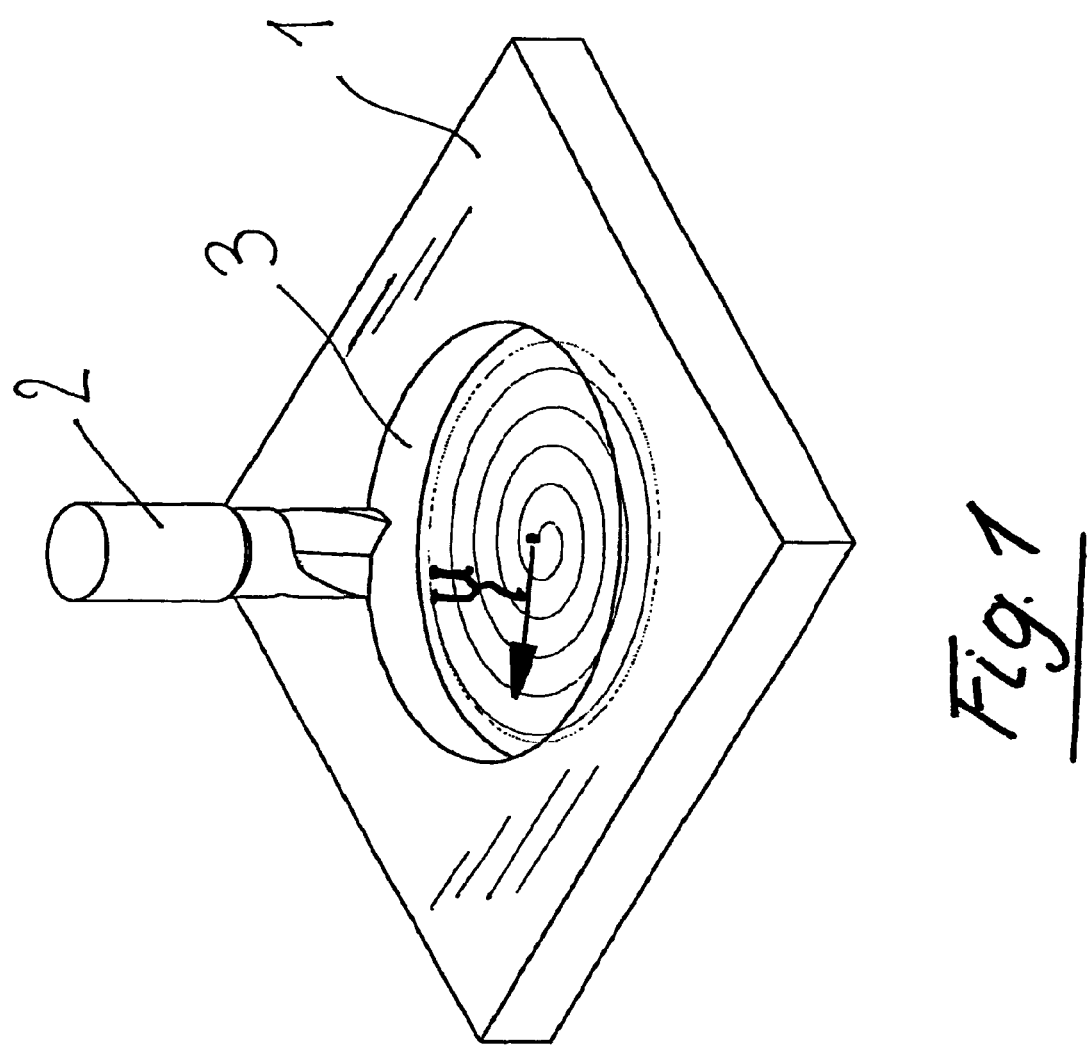
FIG. 1 is a schematic view showing a tool for making a large diameter hole.

FIG. 1 shows a metal plate 1, for example a steel plate, therethrough a circular hole 3, having a comparatively large diameter, must be made by a two-fluted mill 2 which is driven step by step starting from a center of the hole 3 being made and proceeding radially outward in the direction of the arrow U as it will be disclosed in a more detailed manner hereinafter.

Figure 2:
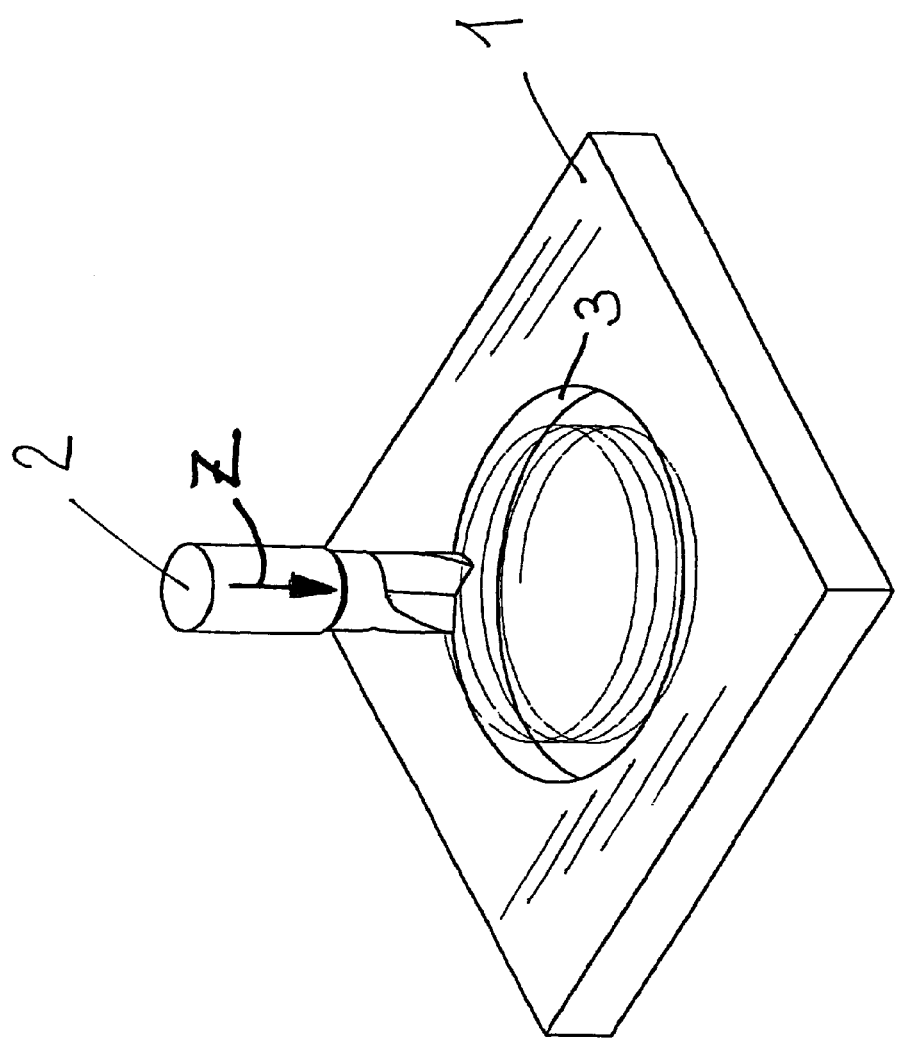
FIG. 2 shows the tool of FIG. 1 penetrating into a workpiece.

As shown in FIG. 2, the two-fluted mill 2 can be driven both radially of the hole 3 and through the depth of the plate 1 or workpiece in the direction Z.

Then, by controllably driving the two-fluted mill 2 both radially (U) and in a vertical plane (Z) it is possible to make, by a comparatively small diameter tool 2, both holes having a small diameter and holes 3 having a large diameter.

At will, said tool may be driven with a translation movement U+Y to process or machine the pressure area, or with either a tool translation X+Y or a tool translation X+U+Y to perform larger machining operations in said pressure area.

That same combination of operating or working axes may also be used to drive an adjoining thermal cutting device (of an oxygenlance, plasma, laser and so on cutting type) to provide different shape perforated and cut workpieces.

Figure 3:
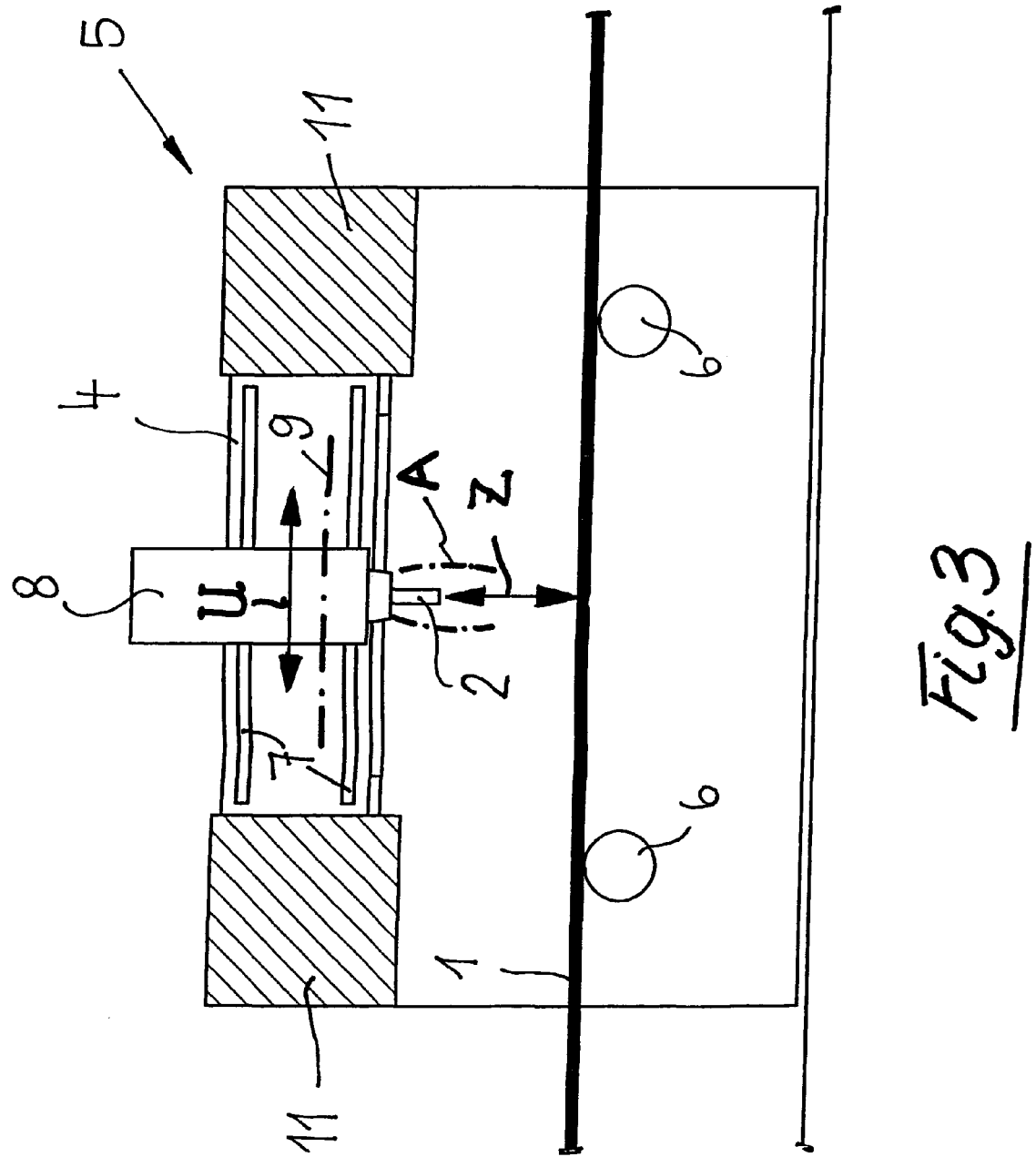
FIG. 3 is a further schematic view showing a horizontal arm of a gantry machine including the apparatus according to the present invention.

FIG. 3 is a front view showing a horizontal arm 4 of a gantry assembly generally indicated by 5, therethrough a metal plate 1 is conveyed.

Above said metal plate 1, the horizontal arm 4 supporting, through horizontal parallel guides 7, an apparatus or device 8 including a small diameter two-fluted mill 2, and controllably driven in the direction indicated by the arrow (U) on said parallel guides 7 of said horizontal arm 4.

The movement in the direction of the double arrow (U) is controllably performed by coupling the apparatus 8, for example by a per se known ball circulating screw 9 or a rack, or by linear motors or any other suitable coupling mechanisms, as schematically indicated by the dashed line in FIG. 3, said ball recirculating screw 9 being driven by a controlled motor (not shown) which is controlled by a numerical control assembly, of a type conventionally used in machine tools.

The apparatus 8 supports said two fluted mill or tool 2, which, by any per se known driving mechanism, can be controllably driven in a vertical plane, as shown by the double arrow (Z).

Figure 4:
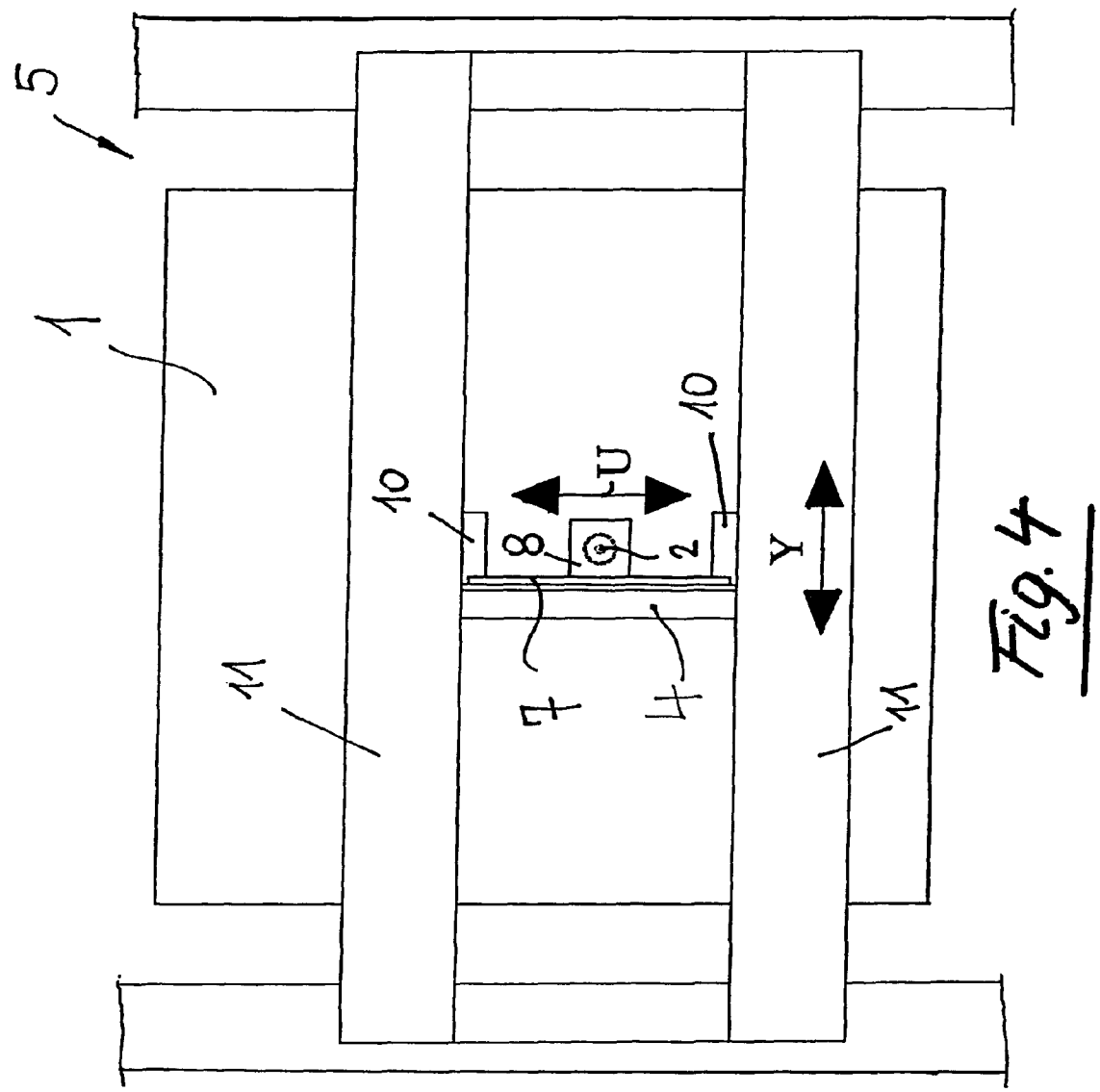
FIG. 4 is a top plan view showing the gantry assembly of the gantry machine including the apparatus according to the present invention.

FIG. 4 is a top plan view showing the metal plate 1 arranged in the gantry assembly 5, arid shows moreover the apparatus 8 which can be controllably driven in the driving directions indicated by the double arrow (U), FIG. 4 also showing the milling tool 2.

Thus, owing to the provision of said parallel guides 7 and of said per se known controlled driving means (not shown in FIG. 4), the apparatus can be continuously driven in a horizontal plane with respect to the metal plate 1.

Moreover, owing to the provision of the horizontal parallel guides 10, integral with the cross members 11, and of the controlled driving means, said apparatus 8 can also be driven in the direction indicated by the double arrow (Y), and said parallel guides can extend through the overall length of the cross members, as shown by the dashed line in FIG. 4.

Accordingly, since the two-fluted mill 2 is both simultaneously controllably driven along the guides 7 in the direction of the arrow (U) and along the guides 10 in the direction of the arrow (Y), it is possible to make the circular hole 3 shown in FIG. 1. Said hole 3, of large diameter, being made by said very small diameter two-fluted milling tool 2, which, accordingly, is driven by a small power electric motor.

In this connection it should be apparent that, instead of a ball recirculating screw, it would also possible to use other driving means such as a pinion and rack assembly, in combination with a geared unit, linear motors or other driving mechanisms adapted to controllably drive the milling tool 2.

Figure 5:
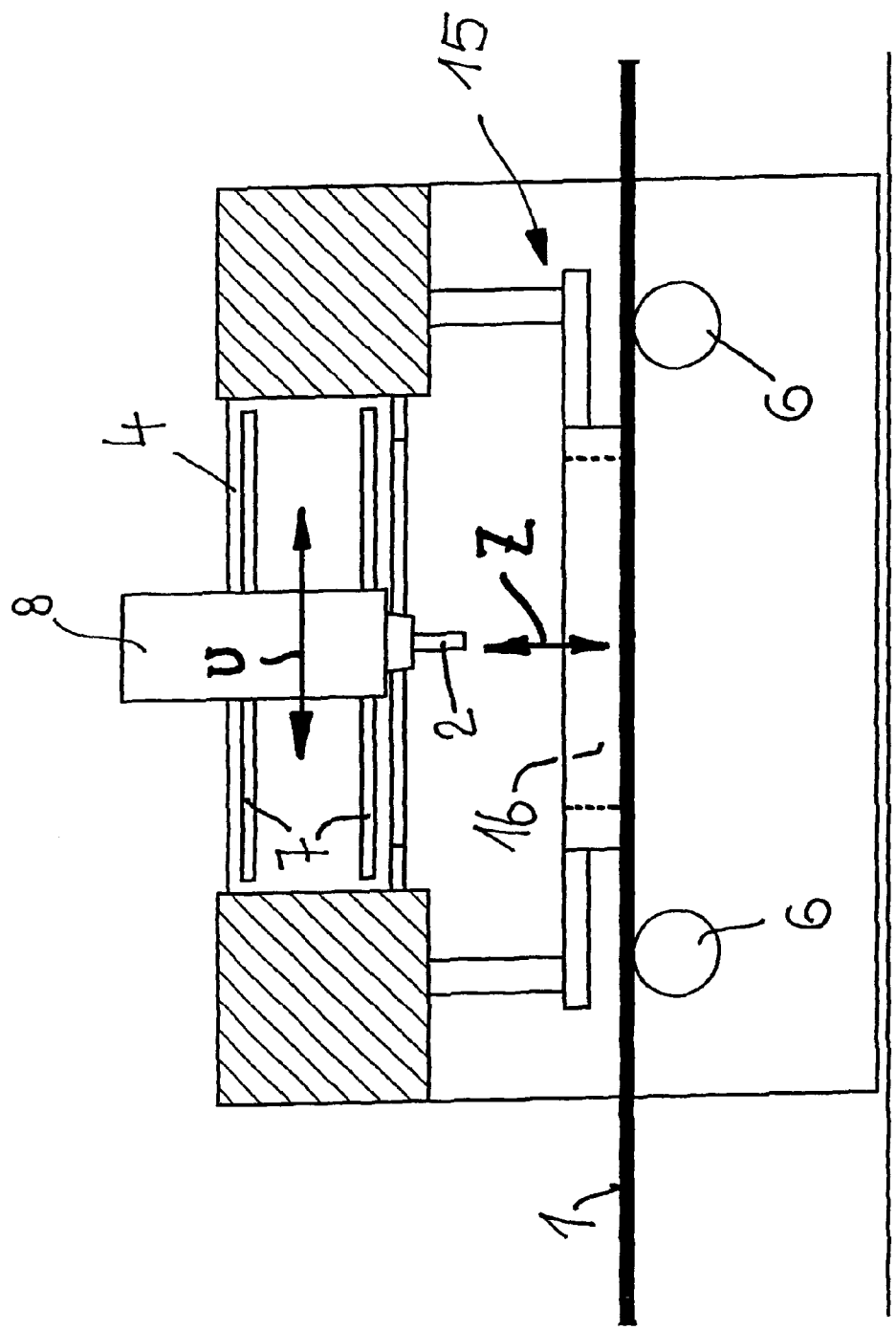
FIG. 5 shows the gantry machine of FIG. 3, including a device for locking and adjusting or aligning an underlying workpiece.

Advantageously, as is shown in FIG. 5, above the metal plate 1 a device generally indicated by 15 is arranged, said device being controllably driven in a vertical plane (Z) and comprising a central opening (16) to allow the milling tool (2) to machine the metal plate 1.

Thus, owing to the provision of said device 15, the metal plate 1, which is frequently deformed, is held at a suitable machining position in a horizontal plane, to allow the tool 2 to properly make one or more holes 3 through said plate.

Figure 6:
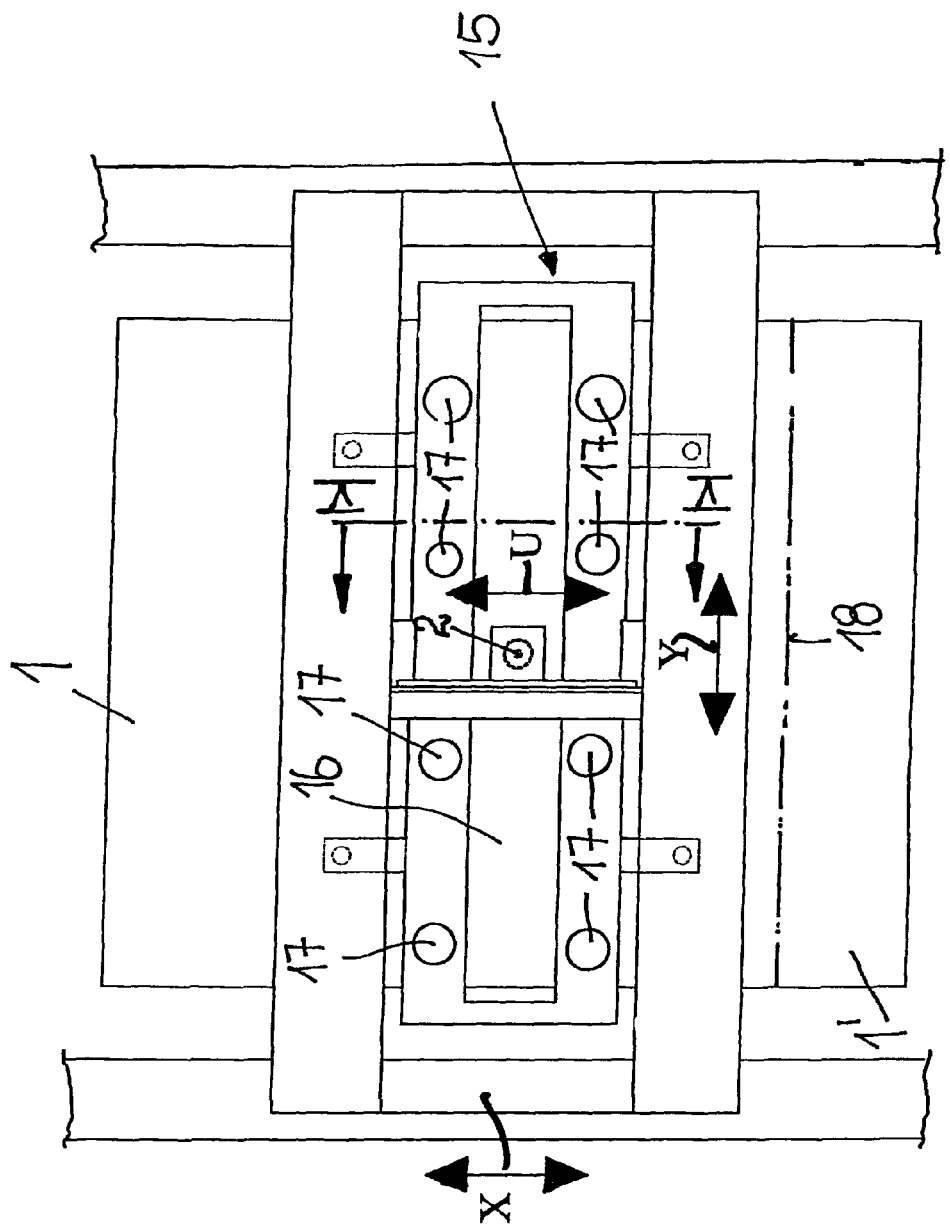
FIG. 6 is a top plan view of the locking and adjusting device schematically shown in FIG. 5.

FIG. 6 is a top plan view showing the above device 15, including a rectangular opening 16 for allowing the tool 2 to be freely driven in the direction of the arrows U and Y.

Advantageously, said device 15 may also comprise electromagnets 17 or the like elements, adapted to be controllably driven, for removing finished workpieces or waste portions generated in machining the metal plate 1, and moreover for loading further plates or workpieces to be drilled, thereby said device 15 operates both as a workpiece loading and unloading means. In other words, said controlled magnets or the like elements 17 can be used both for loading a new workpiece or removing a workpiece 1' (FIG. 6) already machined and cross-sectioned along the dashed line 18. In this connection it should be apparent that that same loading and removing functions can be also performed by suction cups or other driving means.

Finally, as schematically shown in FIG. 3, the structure encompassing the tool can also comprise a suction assembly (A) for removing milling and drilling chips, generated in machining the workpiece, at that same moment as they are generated, thereby preventing said chips from being spread through the plate.

Figure 7:
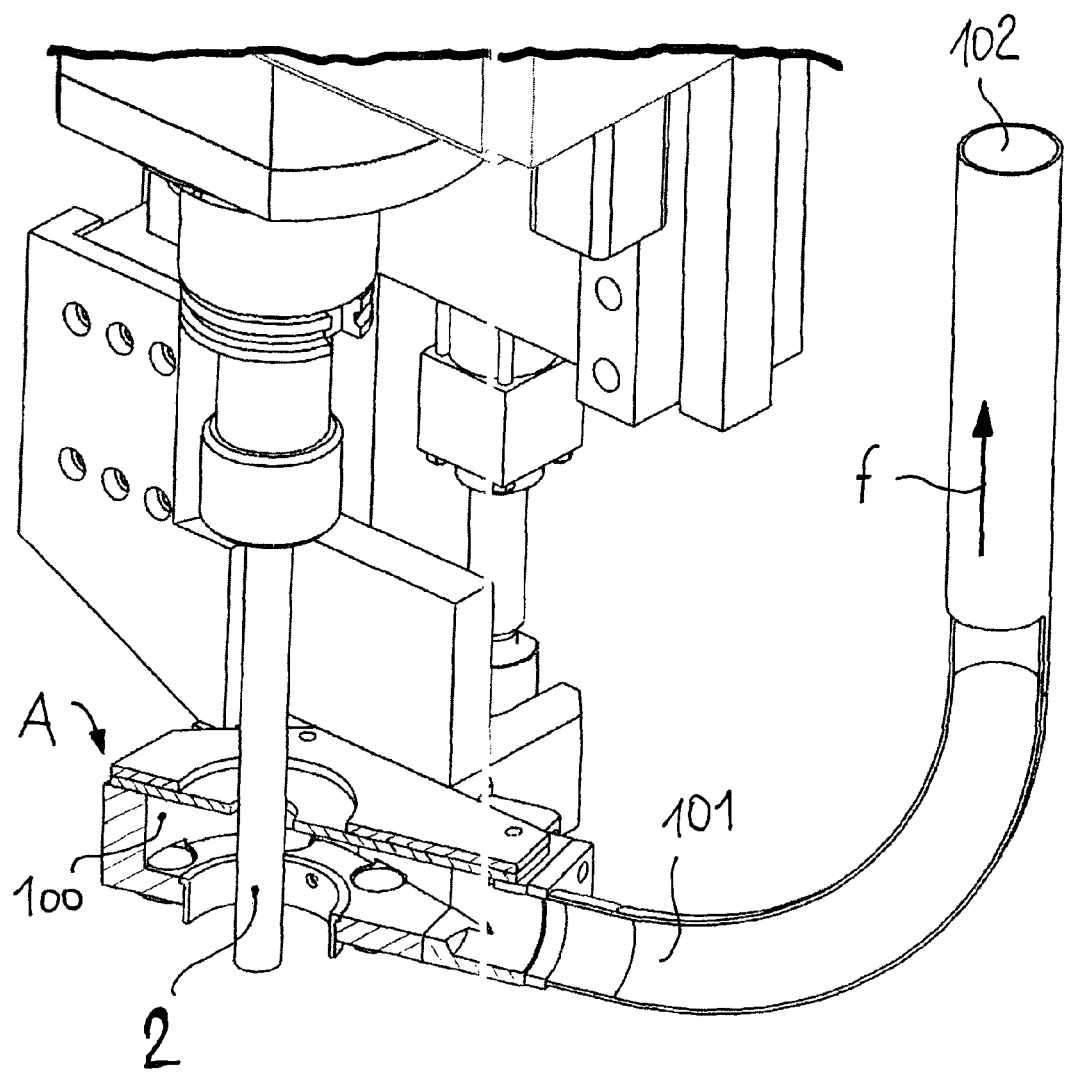
FIG. 7 is a perspective View showing a suction system encompassing the tool.

FIG. 7 is a partially cross-sectioned perspective view showing the chip suction device (A), said device (A) including a chamber 100 therethrough the milling tool 2 is driven, said chamber 100 being coupled to a suction tube 101 having an end portion 102 connected to a suction fan, not shown, for drawing air and chips from the chamber 100 through said tube 101 as indicated by the arrow (f).

The invention claimed is:

1. An apparatus for machining holes in a plate, comprising:
a machine head for supporting an elongated milling tool rotatable about a longitudinal axis along which the tool extends, the head being vertically movable along the longitudinal axis to a milling position in which the tool is in milling engagement with the plate and forms an initial hole of an initial size in the plate;
a device for moving the plate into the milling position, for holding the plate in the milling position, and for removing the plate from the milling position, the device having an opening that extends in a generally horizontal plane along two mutually orthogonal directions that are perpendicular to the longitudinal axis, the opening being sized to receive the tool with mechanical clearance in both the orthogonal directions in the milling position;
a first pair of guides extending along one of the orthogonal directions, and a second pair of guides extending along the other of the orthogonal directions; and
a gantry mounted on the guides for supporting the head for movement in the horizontal plane in the milling position, and for jointly moving the tool with clearance within the opening simultaneously along both the orthogonal directions to form an enlarged hole of a greater size than the initial size in the plate.

2. The apparatus of claim 1, wherein the milling tool is a drill bit for forming the initial hole as a circular hole having an initial diameter, and for forming the enlarged hole with a greater diameter.

3. The apparatus of claim 1, wherein the device is in pressing engagement with the plate in the milling position.

4. The apparatus of claim 1, wherein the plate is constituted of a metal material, and wherein the device has electromagnets for electromagnetically attracting and releasing the metal plate.

5. The apparatus of claim 1, wherein the device has suction cups for attracting and releasing the plate with suction.

6. The apparatus of claim 1, wherein the opening of the device is generally rectangular.

7. The apparatus of claim 1, and a waste removal assembly including a chamber surrounding the tool in the milling position, and a passageway leading away from the chamber, and operative for removing milling waste in the chamber along the passageway by suction.

* * * * *